United States Patent
Liu

(10) Patent No.: US 9,680,940 B2
(45) Date of Patent: Jun. 13, 2017

(54) METHOD, DEVICE AND SYSTEM FOR ACQUIRING DATA TYPE DEFINITION

(71) Applicant: Huawei Technologies Co., Ltd., Shenzhen, Guangdong (CN)

(72) Inventor: Tao Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 509 days.

(21) Appl. No.: 14/195,466

(22) Filed: Mar. 3, 2014

(65) Prior Publication Data

US 2014/0181254 A1  Jun. 26, 2014

Related U.S. Application Data

(63) Continuation of application No. PCT/CN2012/076290, filed on May 30, 2012.

(51) Int. Cl.
  *G06F 15/16* (2006.01)
  *H04L 29/08* (2006.01)
  *G06F 17/30* (2006.01)

(52) U.S. Cl.
  CPC ........ *H04L 67/16* (2013.01); *G06F 17/30943* (2013.01)

(58) Field of Classification Search
  CPC . H04L 67/2823; H04L 67/2819; H04L 67/16; H04L 63/20; H04L 29/08; H04L 65/4084; H04L 67/22; H04L 12/5885; G06F 17/30943
  See application file for complete search history.

(56) References Cited

U.S. PATENT DOCUMENTS

| | | | | |
|---|---|---|---|---|
| 6,640,238 B1* | 10/2003 | Bowman-Amuah | ... | G06F 9/541 709/201 |
| 2003/0093572 A1* | 5/2003 | Laux | ..................... | G06F 9/5055 709/250 |
| 2003/0172110 A1* | 9/2003 | Kunisetty | ............. | H04L 69/329 709/203 |
| 2005/0050173 A1* | 3/2005 | Kikuchi | ............ | G06F 17/30867 709/219 |
| 2005/0267892 A1* | 12/2005 | Patrick | .................... | H04L 67/28 |
| 2005/0267947 A1* | 12/2005 | Patrick | .................... | H04L 67/16 709/217 |
| 2006/0015631 A1* | 1/2006 | Bregant-Belin | ........ | H04L 67/16 709/230 |
| 2006/0168215 A1* | 7/2006 | McIntyre | ............ | G06F 17/3089 709/225 |

(Continued)

FOREIGN PATENT DOCUMENTS

CN  101771701 A  7/2010
CN  101895520 A  11/2010
(Continued)

*Primary Examiner* — Benjamin M Thieu
(74) *Attorney, Agent, or Firm* — Leydig, Voit & Mayer, Ltd.

(57) ABSTRACT

The embodiments of the present invention provide a method, device and system for acquiring a data type definition. Through a data type definition management server centrally managing data type definitions and sending the data type definition to a terminal device according to a request of a terminal device, the data type definition can be repeatedly used by different terminal devices, thereby improving the reusability of the data type definition.

15 Claims, 4 Drawing Sheets

(56) References Cited

U.S. PATENT DOCUMENTS

| | | | | |
|---|---|---|---|---|
| 2006/0236313 | A1* | 10/2006 | Bibr | G06F 9/44526 717/168 |
| 2007/0156726 | A1* | 7/2007 | Levy | G06F 17/3002 |
| 2007/0156878 | A1* | 7/2007 | Martin | G06Q 10/10 709/223 |
| 2012/0110603 | A1* | 5/2012 | Kaneko | H04L 63/08 719/328 |

FOREIGN PATENT DOCUMENTS

| | | |
|---|---|---|
| CN | 102137136 A | 7/2011 |
| JP | 2007011470 A | 1/2007 |

\* cited by examiner

METHOD, DEVICE AND SYSTEM FOR ACQUIRING DATA TYPE DEFINITION

CROSS-REFERENCE TO RELATED APPLICATIONS

This application is a continuation of International Patent Application No. PCT/CN2012/076290, filed on May 30, 2012, which is hereby incorporated by reference in its entirety.

TECHNICAL FIELD

The present invention relates to the field of communication techniques, and particularly, relates to a method, device and system for acquiring a data type definition.

BACKGROUND

Web Services have become an increasingly important technology of enterprise application integration, and it solves a problem about interoperability among heterogeneous systems. The Web Services mainly include three components: a service provider, a service registration center and a service requester. The service provider is used for providing a web application service and performing a web application service registration on the service registration center, so that the services provided by the service provider may be discovered by the service requester. The service registration center is used for registering and publishing, as a medium between the service provider and the service requester, a web application service. The service requester is used for requesting a web application service from the service registration center and calling the web application service to create an application program.

Web Services describe, by adopting a Web Services Description Language (WSDL) based on an Extensible Markup Language (XML), a web application service (also Web services) provided by a service provider, namely, describe the Web service provided by the service provider through a WSDL document. The WSDL document describes an interface and implementation detail of the web application service, and specifically includes a data type definition, an operation, binding information, a network location and the like of the web application service. When the WSDL document describes the data type definition of the Web services, the data type definition is described directly by adopting Types elements in the WSDL document. However, due to the privacy of the WSDL document in a terminal device, the data type definition described in the WSDL document cannot be used by other terminal devices, which lead to the low reusability of the data type definition.

SUMMARY

Embodiments of the present invention provide a method, device and system for acquiring a data type definition, which are used for solving the problem of the low reusability of the data type definition.

The embodiments of the present invention provide a method for acquiring a data type definition, including: receiving a request message for acquiring the data type definition, which is sent by a terminal device, wherein, the request message for acquiring the data type definition carries an identifier for identifying the data type definition; determining the data type definition according to the identifier for identifying the data type definition; and returning the data type definition to the terminal device.

The embodiments of the present invention further provide a method for acquiring a data type definition, including: sending a request message for acquiring the data type definition to a data type definition management server, wherein, the request message for acquiring the data type definition carries an identifier for identifying the data type definition; and receiving a response message returned by the data type definition management server, wherein, the response message carries the data type definition.

The embodiments of the present invention further provide a data type definition management device, including: a first receiving module, configured to receive a request message for acquiring the data type definition, which is sent by a terminal device, wherein, the request message for acquiring the data type definition carries an identifier for identifying the data type definition; a determining module, configured to determine the data type definition according to the identifier for marking the data type definition; and a first sending module, configured to return the data type definition to the terminal device.

The embodiments of the present invention further provide a data type definition acquiring device, including: a second sending module, for sending a request message for acquiring the data type definition to a data type definition management server, wherein, the request message for acquiring the data type definition carries an identifier for identifying the data type definition; and a second receiving module, for receiving a response message returned by the data type definition management server, wherein, the response message carries the data type definition.

The embodiments of the present invention further provide a system for acquiring a data type definition, including a data type definition management device, for receiving a request message for acquiring a data type definition, which is sent by a data type definition acquiring device, wherein, the request message for acquiring the data type definition carries an identifier for identifying the data type definition; querying the data type definition according to the identifier for identifying the data type definition; and returning the data type definition to the data type definition acquisition device. The data type definition acquiring device, for sending the request message for acquiring the data type definition to the data type definition management device and receiving a response message returned by the data type definition management device, wherein, the response message carries the data type definition.

In the embodiments of the present invention, through a data type definition management server centrally managing data type definitions and sending a data type definition to a terminal device according to a request of a terminal device, the data type definition can be repeatedly used by different terminal devices, thereby improving the reusability of the data type definition.

DESCRIPTION OF EMBODIMENTS

To make objectives, technical solutions and advantages of embodiments of the present invention clearer, a clear and complete description of technical solutions of the embodiments of the present invention will be given below, in combination with the accompanying drawings in the embodiments of the present invention. Apparently, the embodiments described below are a part, but not all, of the embodiments of the present invention. All of other embodiments, obtained by those skilled in the art based on the embodiments of the present invention without any inventive efforts, fall into the protection scope of the present invention.

Firstly, an overall technical solution of the embodiments of the present invention is illustrated.

Embodiment 1 of the method is as follows.

Figure 1:
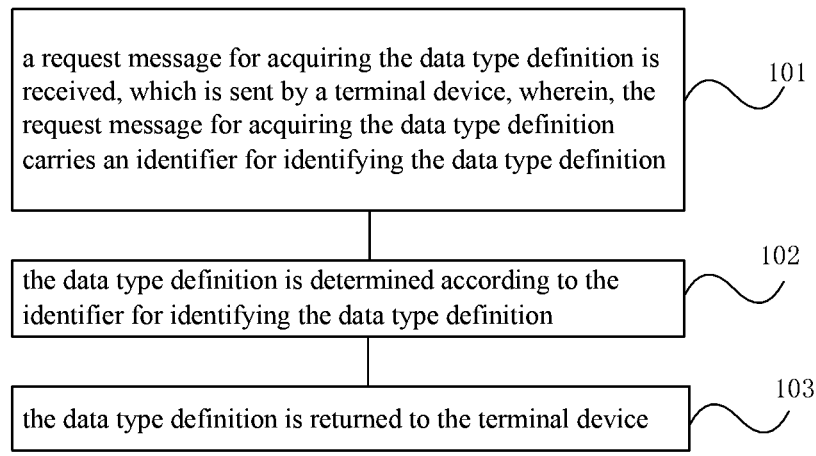
FIG. 1 is a schematic flowchart of an embodiment of a method for acquiring a data type definition in the embodiments of the present invention.

FIG. 1 is a schematic flowchart of an embodiment of a method for acquiring a data type definition in the embodiments of the present invention. As shown in FIG. 1, the method includes the flowing steps.

Step 101, a request message for acquiring the data type definition is received, which is sent by a terminal device, wherein, the request message for acquiring the data type definition carries an identifier for identifying the data type definition.

In the embodiment of the present invention, the identifier for identifying a data type definition may be a name of the data type definition.

It should be noted that, before the request message sent by the terminal device is received, the method may further include: acquiring the data type definition. Wherein, the means of acquiring the data type definition may specifically be: receiving a data type definition registration request message sent by a registration client, wherein, the data type definition registration request message carries the data type definition; and storing the data type definition.

In the embodiment of the present invention, the registration client is used for sending the data type definition to a data type management server to perform a registration.

Moreover, it should further be noted that, in the embodiment of the present invention, the terminal device may be any electronic product capable of performing a human-machine interaction with a user through a keyboard, a mouse, a remote controller, a touch panel or a sound control device, which includes but not limited to a computer, a mobile phone and the like.

Step 102, the data type definition is determined according to the identifier for identifying the data type definition.

Specifically, in the embodiment of the present invention, when receiving the request message for acquiring the data type definition, which is sent by the terminal device, the data type definition management server acquires, by resolving the request message, the identifier of the data type definition carried in the request message, and searches, according to the identifier of the data type definition, for a file whose file name is the identifier. The data type definition is pre-stored in the file.

Step 103, the data type definition is returned to the terminal device.

In the embodiment of the present invention, through a data type definition management server centrally managing data type definitions and sending a data type definition to a terminal device according to a request of a terminal device, the data type definition can be repeatedly used by different terminal devices, thereby improving the reusability of the data type definition.

Embodiment 2 of the method is as follows.

Figure 2:
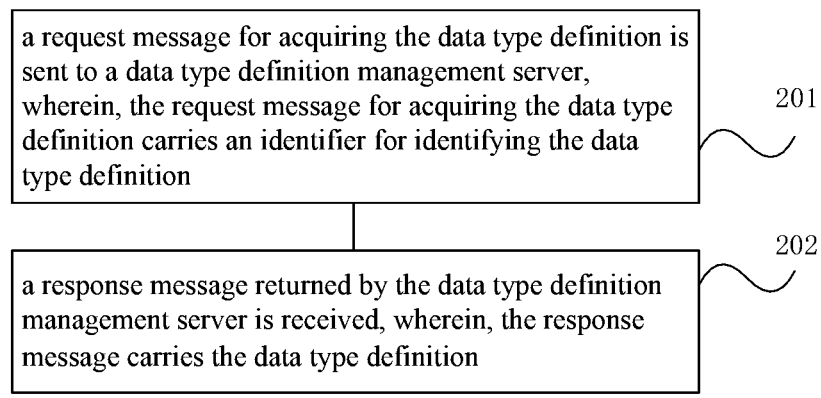
FIG. 2 is a schematic flowchart of another embodiment of a method for acquiring a data type definition in the embodiments of the present invention.

FIG. 2 is a schematic flowchart of another embodiment of a method for acquiring a data type definition in the embodiments of the present invention. As shown in FIG. 2, the method includes the following steps.

Step 201, a request message for acquiring the data type definition is sent to a data type definition management server, wherein, the request message for acquiring the data type definition carries an identifier for identifying the data type definition.

In the embodiment of the present invention, the identifier for identifying the data type definition may be a name of the data type definition.

It should be noted that, before the request message for acquiring the data type definition is sent to the data type definition management server, the method may further includes: determining that a Web Services Description Language (WSDL) document carries the identifier for acquiring the data type definition from the data type definition management server.

Step 202, a response message returned by the data type definition management server is received, wherein the response message carries the data type definition.

In the embodiment of the present invention, through a data type definition management server centrally managing data type definitions and sending a data type definition to a terminal device according to a request of a terminal device, the data type definition can be repeatedly used by different terminal devices, thereby improving the reusability of the data type definition.

Embodiment 3 of the method is as follows.

Figure 3:
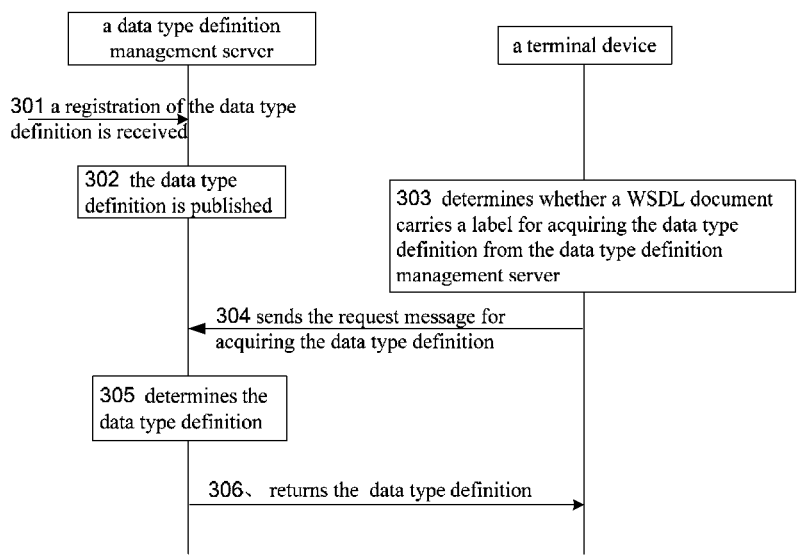
FIG. 3 is a schematic flowchart of another embodiment of a method for acquiring a data type definition in the embodiments of the present invention.

FIG. 3 is a schematic flowchart of another embodiment of a method for acquiring a data type definition in the embodiments of the present invention. As shown in FIG. 3, the method includes the following steps.

Step 301, a registration of the data type definition is received by a data type definition management server.

In the embodiment of the present invention, the data type definition management server may have: an Application Programming Interface (API) layer, for providing an API package realized on the basis of various languages and exposing related management interfaces; a Portal layer, for providing a management interface; a communication layer, for a terminal device end assessing, through an API, to a data type server; a management layer, for managing the data type definition; and a storing layer, for storing the data type definition, other necessary configuration parameters and the like.

In the embodiment of the present invention, the data type definition management server is used for storing the registered data type definition and managing the registered data type definition.

Specifically, managerial personnel may transmit the data type definition to the data type definition management server through a local registration client. The data type definition management server stores a data type definition in a storing layer of the data type definition management server, records the identifier of the data type definition and uses the identifier of the data type definition as an index for querying the data type definition. Moreover, the data type definition management server may also realize storage and management of the data type definition by calling a remote client. When the called remote client communicates with the data type definition management server, a simple object access soap protocol based on a hypertext transport protocol (HTTP) may be adopted for communication.

Step 302, the data type definition is published by the data type definition management server.

In the embodiment of the present invention, when the data type definition is registered in the data type server, the publication of the data type definition is realized. By publishing the data type definition, that the data type definition is knowable for the terminal device is realized, in other words, the terminal device may acquire the required data type definition by accessing to the data type definition management server.

Step 303, the terminal device determines whether a WSDL document carries a label for acquiring the data type definition from the data type definition management server when initializing and analyzing the WSDL document.

In the embodiment of the present invention, a WSDL document is required to be extended in advance. In other words, the label for quoting the data type definition in the data type server is extended in an existing WSDL document.

For example, the following label may be extended in a WSDL document for notifying a terminal device that a data type definition needs to be acquired from a data type definition management server.

<import schemaRemote=[ip] [port]/>

"import schemaRemote" indicates that in the WSDL document, the data type definition is required to be introduced from the outside. "[ip] [port]" indicates an address and a port of the data type definition management server, where the data type definition, which is required to be quoted, lies.

Moreover, based on the security management requirement of the data type definition management server, a user name and password of the terminal device, which is required to introduce a data type definition, may further be extended in the label extended in the aforementioned WSDL document. The request message for acquiring the data type definition, which is sent from the terminal device to the data type definition management server, may carry the user name and password of the terminal device. Only when the user name and password of the terminal device are identical to the user name and password of the terminal device stored in the data type server, the data type definition management server responds to the request message sent by the terminal device. In the label extended in the WSDL document, the extension of the user name and password of the terminal device, which are required to introduce a data type definition, may be as follows:

import schemaRemote=[ip] [port] client id="xx"password="xx" namespace="YY"/>

It should be noted that, the password of a terminal device carried in the request message for acquiring the data type definition, which is sent from the terminal device to the data type definition management server, may be carried in a mode of plaintext or ciphertext.

Moreover, it should further be noted that, in the embodiment of the present invention, the terminal device may be any electronic product capable of performing a human-machine interaction with a user through a keyboard, a mouse, a remote controller, a touch panel or a sound control device, which includes but not limited to a computer, a mobile phone and the like.

Step 304, if the WSDL document carries a label for acquiring the data type definition from the data type definition management server, the terminal device sends the request message for acquiring the data type definition to the data type definition management server, wherein, the request message carries the identifier of the data type definition, such as the name of the data type definition.

In the embodiment of the present invention, the terminal device may communicate with the data type definition management server through a Socket protocol. The request message carries the name of the data type definition, so that the data type definition management server determines the data type definition. A packet of the request message may be shown as follows.

```
<?xml version="1.0" encoding="UTF-8"?>
<root>
<name>xxx</name>
<version>1.0</version>
</root>
```

It should be noted that, the aforementioned request message may further carry the version number of the data type definition. If the request message carries the version number of the data type, the data type definition management server determines the data type definition according to the name of the data type definition carried in the request message, and then determines the version of the data type definition according to the version number of the data type definition. If the request message does not carry the version number of the data type definition, the data type definition management server may send the latest version of the data type definition to the terminal device.

It should be noted that, in the embodiment of the present invention, if the WSDL document carries the label for acquiring the data type definition from the data type definition management server, the terminal device may also check whether a data type definition which has been used by the WSDL document exists in its own cache before the terminal device sends the request message for acquiring the data type to the data type definition management server. In the embodiment of the present invention, if a certain data type definition has been used by the terminal device, the data type definition is cached in the cache of the terminal device. The terminal device may directly acquire the data type definition from its own cache, thereby avoiding the acquisition from the data type definition management server and reducing the overhead of the data type definition management server.

If the terminal device finds that no data type definition which has been used by the WSDL document exists in its own cache, the terminal device sends the request message for acquiring the data type definition to the data type definition management server.

Step 305, the data type definition management server determines the data type definition according to the name of the data type definition carried in the request message.

If the request message carries the version number of the data type definition, the data type definition management server determines the data type definition according to the name of the data type definition carried in the request message, and then determines the version of the data type definition according to the version number of the data type definition. If the request message does not carry the version number of the data type definition, the data type definition management server returns the latest version of the data type definition.

Step 306, the data type definition management server returns the determined data type definition to the terminal equipment.

In the embodiment of the present invention, through a data type definition management server centrally managing data type definitions and sending a data type definition to a terminal device according to a request of a terminal device, the data type definition can be repeatedly used by different terminal devices, thereby improving the reusability of the data type definition.

An overall technical solution of the embodiments of the device of the present invention is illustrated below.

Embodiment 1 of the device is as follows.

Figure 4:
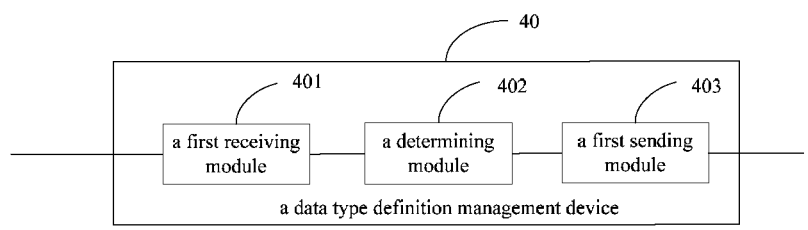
FIG. 4 is a schematic diagram of an embodiment of a data type definition management device in the embodiments of the present invention.

FIG. 4 is a schematic diagram of an embodiment of a data type definition management device in the embodiments of the present invention. As shown in FIG. 4, the data type definition management device 40 includes a first receiving module 401, a determining module 402 and a first sending module 403.

The first receiving module 401 is used for receiving a request message for acquiring a data type definition, which is sent by a terminal device, wherein, the request message for acquiring the data type definition carries an identifier for identifying the data type definition.

The determining module 402 is used for determining the data type definition according to the identifier for identifying the data type definition.

The first sending module 403 is used for returning the data type definition to the terminal device.

In the embodiment of the present invention, through a data type definition management server centrally managing data type definitions and sending a data type definition to a terminal device according to a request of a terminal device, the data type definition can be repeatedly used by different terminal devices, thereby improving the reusability of the data type definition.

Figure 5:
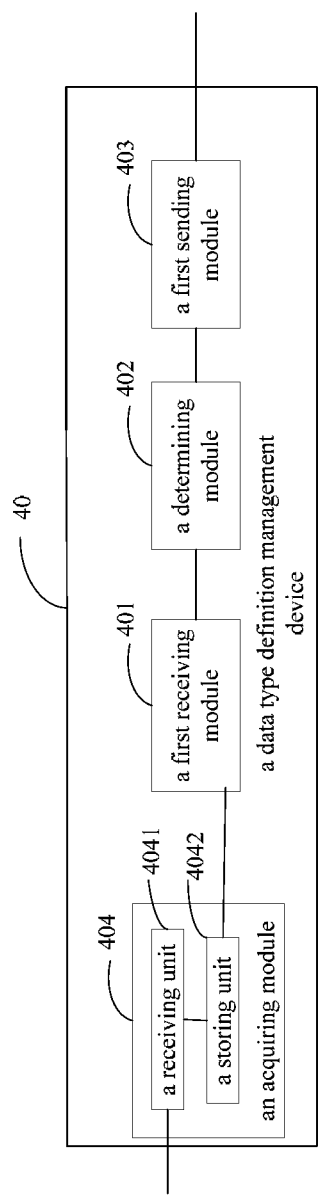
FIG. 5 is a schematic diagram of another embodiment of a data type definition management device in the embodiments of the present invention.

Alternatively, as shown in FIG. 5, the data type definition management device 40 may further include an acquiring module 404 for acquiring the data type definition.

Moreover, it should be noted that, the acquiring module 404 may further include a receiving unit 4041 and a storing unit 4042.

The receiving unit 4041 is used for receiving a data type definition registration request message sent by a registration client, wherein, the data type definition registration request message carries the data type definition.

The storing unit 4042 is used for storing the data type definition.

Embodiment 2 of the device is as follows.

Figure 6:
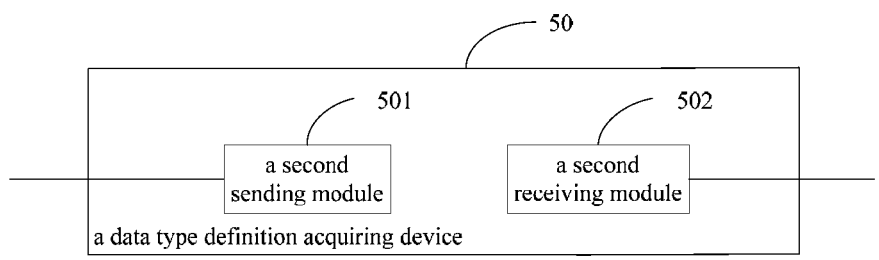
FIG. 6 is a schematic diagram of an embodiment of a data type definition acquiring device in the embodiments of the present invention.

FIG. 6 is a schematic diagram of an embodiment of a data type definition acquiring device in the embodiments of the present invention. As shown in FIG. 6, the data type definition acquiring device 50 includes a second sending module 501 and a second receiving module 502.

The second sending module 501 is used for sending a request message for acquiring the data type definition to a data type definition management server, wherein, the request message for acquiring the data type definition carries an identifier for identifying the data type definition.

The second receiving module 502 is used for receiving a response message returned by the data type definition management server, wherein, the response message carries the data type definition.

In the embodiment of the present invention, through sending the request message for acquiring the data type definition to the data type definition management server, which centrally manages data type definitions, and acquiring the data type definition from the data type definition management server, the data type definition acquiring device makes the data type definition can be repeatedly used by different terminal devices, thereby improving the reusability of the data type definition.

Figure 7:
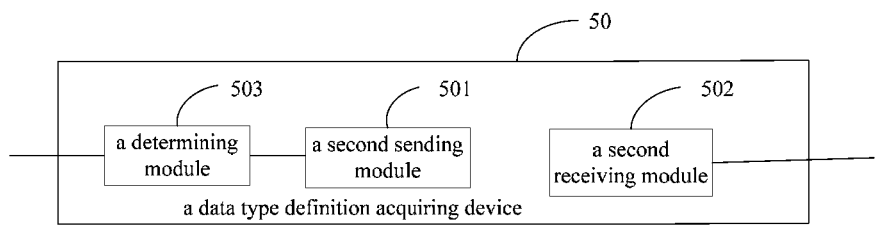
FIG. 7 is a schematic diagram of another embodiment of the data type definition acquiring device in the embodiments of the present invention.

Alternatively, as shown in FIG. 7, the data type definition acquisition device 50 may further include a determining module 503. The determining module 503 is used for determining that a Web Services Description Language (WSDL) document carries a label for acquiring the data type definition from the data type definition management server.

The overall technical solution of the embodiment of the system of the present invention is illustrated below.

Figure 8:
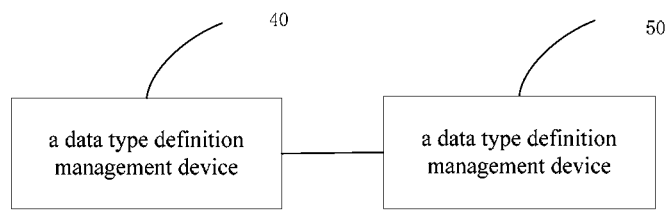
FIG. 8 is a schematic diagram of an embodiment of a system for acquiring a data type definition in the embodiments of the present invention.

FIG. 8 is a schematic diagram of an embodiment of a system for acquiring a data type definition in the embodiments of the present invention. As shown in FIG. 8, the system for acquiring a data type definition includes a data type definition management device 40 and a data type definition acquisition device 50.

The data type definition management device 40 is used for receiving a request message for acquiring a data type definition, which is sent by the data type definition acquisition device 50, wherein, the request message for acquiring the data type definition carries an identifier for identifying the data type definition; querying the data type definition according to the identifier for identifying the data type definition; and returning the data type definition to the data type definition acquisition device 50.

The data type definition acquisition device 50 is used for sending a request message for acquiring the data type definition to the data type definition management device 40, and receiving a response message returned by the data type definition management device 40, wherein, the response message carries the data type definition.

In the embodiment of the present invention, through sending the request message for acquiring the data type definition to the data type definition management server, which centrally manages data type definitions, and acquiring the data type definition from the data type definition management server, the data type definition acquiring device makes the data type definition can be repeatedly used by different terminal devices, thereby improving the reusability of the data type definition.

It should be noted that, those skilled in the art may clearly understand that, for convenience and briefness of description, the specific working processes of the above-described system, devices, modules and units, can refer to the corresponding processes in the embodiments of the aforementioned methods, which is not described redundantly herein.

It should be appreciated for those of ordinary skill in the art to realize that the modules, units and steps of the examples described combined with the embodiments of the present invention can be realized by electronic hardware, computer software or a combination of the both. In order to clearly illustrate the interchangeability of the hardware and software, the composition and steps of each example are generally described in the description above according to the functions. Whether these functions are executed in a hardware or software mode depends on the specific applications and design constraint conditions of the technical solution. For each specific application, a professional may realize the described functions by different methods, and these realizations should not be considered as being beyond the scope of the present invention.

In several embodiments provided in the application, it should be understood that the disclosed system, devices and methods may be realized in other ways. For example, the embodiments of the above-described devices are merely exemplary. For example, the division of the modules or units is merely a logic function division, and other division ways may be adopted in practice. For example, several units or modules may be combined or integrated in another system; or some characteristics may be omitted or not executed. In addition, the displayed or discussed mutual coupling or direct coupling or communication connection may be indirect coupling or communication connection of devices, modules or units through some interfaces, and may also be in electrical, mechanical or other forms.

The modules or units illustrated as separate components may be or may not be physically separated. The components displayed as modules or units may be or may not be physical modules or units, that is to say, the components may be positioned at one place or may also be distributed on a plurality of network modules or units. The objective of the solution of the embodiments of the present invention may be fulfilled by selecting part of or all of the modules or units according to actual needs.

In addition, in various embodiments of the present invention, the functional modules or units may be integrated in one processing module or unit. Or the functional modules or units may separately and physically exist. Or two or more modules or units may be integrated in one module or unit. The aforementioned integrated modules or units may be realized in the form of hardware or software functional units.

When the integrated modules or units are realized in the form of software functional modules or units and sold or used as independent products, the integrated modules or units may be stored in a computer-readable storage medium. Based on such an understanding, the technical solution of the present invention substantially, or the part of the present invention making contribution to the prior art, or all of or part of the technical solution may be embodied in the form of a software product, and the computer software product is stored in a storage medium, which includes a plurality of instructions enabling computer equipment (which may be a personal computer, a server, network equipment or the like) to execute all of or part of the steps in the methods of the embodiments of the present invention. The aforementioned storage medium includes: various media capable of storing program codes, such as U disk, mobile hard disk, read-only memory (ROM), random access memory (RAM), disk, optical disk or the like.

Described above is the specific embodiments of the present invention only, but the protection scope of the present invention is not limited to this, any skilled one who is familiar with this art could readily think of various equivalent modifications or substitutions within the disclosed technical scope of the present invention, and these modifications or substitutions shall fall within the protection scope of the present invention. Thus, the protection scope of the claims should prevail over the protection scope of the present invention.

What is claimed is:

1. A method for providing a data type definition the method comprising:

receiving a request message for acquiring the data type definition, which is sent by a terminal device when the terminal device determines that a Web Services Description Language (WSDL) document carries a label for acquiring the data type definition from a data type definition management server wherein the request message for acquiring the data type definition carries an identifier for identifying the data type definition, and wherein the request message for acquiring the data type definition further carries a version number of the data type definition;

determining the data type definition according to the identifier for identifying the data type definition; and returning the data type definition to the terminal device.

2. The method according to claim 1, wherein before the receiving the request message sent by the terminal device, the method further comprises:

acquiring the data type definition.

3. The method according to claim 2, wherein the request message for acquiring the data type definition further carries a user name and user password of the terminal device; and before the determining the data type definition according to the identifier for identifying the data type definition, the method further comprises:

determining that the user name and user password of the terminal device carried in the request message are identical to a pre-stored user name and user password of the terminal device.

4. The method according to claim 2, wherein the acquiring the data type definition comprises:

receiving a data type definition registration request message sent by a registration client, wherein, the data type definition registration request message carries the data type definition; and storing the data type definition.

5. The method according to claim 4, wherein the request message for acquiring the data type definition further carries a user name and user password of the terminal device; and before the determining the data type definition according to the identifier for identifying the data type definition, the method further comprises:

determining that the user name and user password of the terminal device carried in the request message are identical to a pre-stored user name and user password of the terminal device.

6. The method according to claim 1, wherein the request message for acquiring the data type definition further carries a user name and user password of the terminal device; and before the determining the data type definition according to the identifier for identifying the data type definition, the method further comprises:

determining that the user name and user password of the terminal device carried in the request message are identical to a pre-stored user name and user password of the terminal device.

7. A method for acquiring a data type definition the method comprising:

determining whether a Web Services Description Language (WSDL) document carries a label for acquiring the data type definition from a data type definition management server;

when the WSDL document carries the label, sending a request message for acquiring the data type definition to the data type definition management server, wherein the request message for acquiring the data type definition carries an identifier for identifying the data type definition and wherein the request message for acquiring the data type definition further carries a version number of the data type definition; and receiving a response message returned by the data type definition management server, wherein the response message carries the data type definition.

8. The method according to claim 7, wherein the request message for acquiring the data type definition further carries a user name and user password of a terminal device, so that the data type definition management server determines, according to the identifier for identifying the data type definition, which is carried in the request message for acquiring the data type definition, and returns the data type definition to the terminal device when determining that the user name and user password of the terminal device are identical to a pre-stored user name and user password of the terminal device.

9. The method according to claim 7, wherein the request message for acquiring the data type definition further carries a user name and user password of a terminal device, so that the data type definition management server determines, according to the identifier for identifying the data type definition, which is carried in the request message for acquiring the data type definition, and returns the data type definition to the terminal device when determining that the user name and user password of the terminal device are identical to a pre-stored user name and user password of the terminal device.

10. The method according to claim 7, wherein the sending a request message for acquiring the data type definition to the data type definition management server comprises:
   checking whether the data type definition has been used by the WSDL document;
   if the data type definition has been used by the terminal device, sending a request message for acquiring the data type definition to the data type definition management server.

11. A data type definition management device comprising:
electronic processor hardware; and
a non-transitory computer-readable medium comprising computer-executable instructions that, when executed by the electronic processor hardware, facilitate executing a method comprising the steps:
   receiving a request message for acquiring a data type definition, which is sent by a terminal device when the terminal device determines that a Web Services Description Language (WSDL) document carries a label for acquiring the data type definition from a data type definition management server wherein the request message for acquiring the data type definition carries an identifier for identifying the data type definition, and wherein the request message for acquiring the data type definition further carries a version number of the data type definition;
   determining the data type definition according to the identifier for identifying the data type definition; and
   returning the data type definition to the terminal device.

12. The data type definition management device according to claim 11, wherein the electronic processor hardware is further configured to acquire the data type definition.

13. The data type definition management device according to claim 12, wherein the electronic processor hardware is configured to receive a data type definition registration request message sent by a registration client, wherein, the data type definition registration request message carries the data type definition; and
   the data type definition management device further comprises:
   a memory, configured to store the data type definition.

14. A data type definition acquiring device comprising:
electronic processor hardware; and
a non-transitory computer-readable medium comprising computer-executable instructions that, when executed by the electronic processor hardware, facilitate executing a method comprising the steps:
   determining whether a Web Services Description Language (WSDL) document carries a label for acquiring the data type definition from a data type definition management server;
   when the WSDL document carries the label, sending a request message for acquiring the data type definition to a data type definition management server, wherein the request message for acquiring the data type definition carries an identifier for identifying the data type definition and wherein the request message for acquiring the data type definition further carries a version number of the data type definition; and
   receiving a response message returned by the data type definition management server, wherein the response message carries the data type definition.

15. The data type definition acquiring device according to claim 14, wherein the electronic processor hardware is configured to:
   check whether the data type definition has been used by the WSDL document;
   if the data type definition has been used by the terminal device, send a request message for acquiring the data type definition to the data type definition management server.

* * * * *